United States Patent
Brewster et al.

(10) Patent No.: US 8,186,937 B2
(45) Date of Patent: May 29, 2012

(54) VACUUM PUMP

(75) Inventors: Barrie Dudley Brewster, Brighton (GB); Chan-Cheong Siew, Staines (GB)

(73) Assignee: Edwards Limited, Crawley, West Sussex (GB)

( * ) Notice: Subject to any disclaimer, the term of this patent is extended or adjusted under 35 U.S.C. 154(b) by 1173 days.

(21) Appl. No.: 11/921,983

(22) PCT Filed: May 26, 2006

(86) PCT No.: PCT/GB2006/001948
§ 371 (c)(1),
(2), (4) Date: Dec. 10, 2007

(87) PCT Pub. No.: WO2006/131694
PCT Pub. Date: Dec. 14, 2006

(65) Prior Publication Data
US 2010/0215475 A1    Aug. 26, 2010

(30) Foreign Application Priority Data

Jun. 10, 2005 (GB) .................................. 0511877.3

(51) Int. Cl.
*F04D 29/66* (2006.01)
*F01D 1/36* (2006.01)

(52) U.S. Cl. ......................................... 415/90; 415/119

(58) Field of Classification Search .................. 415/113, 415/229
See application file for complete search history.

(56) References Cited

U.S. PATENT DOCUMENTS

| | | | |
|---|---|---|---|
| 4,872,767 A | 10/1989 | Knapp | |
| 4,971,458 A | 11/1990 | Carlson | |
| 5,603,574 A * | 2/1997 | Ide et al. | 384/117 |
| 5,895,202 A * | 4/1999 | Dauvillier | 415/90 |
| 2001/0010438 A1 | 8/2001 | Bouille et al. | |

FOREIGN PATENT DOCUMENTS

| | | | |
|---|---|---|---|
| DE | 103 20 851 A1 | | 11/2004 |
| EP | 0 220 581 A1 | | 5/1987 |
| EP | 220581 A1 | * | 5/1987 |
| SU | 406048 | | 11/1973 |
| WO | WO 2004/097224 A1 | | 11/2004 |

OTHER PUBLICATIONS

EP 220581 A1 Machine Translation. Accessed EPO website Oct. 5, 2011. 2 pages.*
Kelzon As et al.; English language abstract of SU 406048 A1 entitled "Resilient Bushing for Bearing Housing—Has Increased Vibration Resistance by Having Each Peripheral Slot Finishes Where the Next Begins Decreases Vibration," Nov. 5, 1973.
United Kingdom Search Report of Application No. GB 0511877.3 mailed Oct. 26, 2005; Claims searched: 1-25; Date of search: Oct. 24, 2005.
PCT Notification of Transmittal of the International Search Report and the Written Opinion of the International Searching Authority, or the Declaration of International Application No. PCT/GB2006/001948; Date of mailing: Aug. 8, 2006.
PCT International Search Report of International Application No. PCT/GB2006/001948; Date of mailing of the International Search Report: Aug. 8, 2006.
PCT Written Opinion of the International Searching Authority of International Application No. PCT/GB2006/001948; Date of mailing: Aug. 8, 2006.

* cited by examiner

*Primary Examiner* — Richard Edgar (57) ABSTRACT

A turbomolecular vacuum pump (54) comprises a housing (70) and a rotor (52) supported by a bearing arrangement (64) for rotation relative to the housing (70). The bearing arrangement (64) comprises a bearing (72, 74, 76, 78) supported in both radial and axial directions by a resilient support (80) comprising inner (86) and outer (88) annular portions connected by a plurality of flexible members (84), the resilient support (80) having a radial stiffness in the range from 50 to 500 N/mm.

20 Claims, 5 Drawing Sheets

FIG. 7 though the scope of the claims should not be limited by particular embodiments set forth herein.

VACUUM PUMP

FIELD OF THE INVENTION

This invention relates to a vacuum pump.

BACKGROUND OF THE INVENTION

Vacuum pumps typically comprise an impeller in the form of a rotor mounted on a shaft for rotation relative to a surrounding stator. The shaft is supported by a bearing arrangement comprising two bearings located at or intermediate respective ends of the shaft. One or both of these bearings may be in the form of rolling bearings. Usually, the upper bearing is in the form of a magnetic bearing, and the lower bearing is in the form of a rolling bearing.

Figure 1:
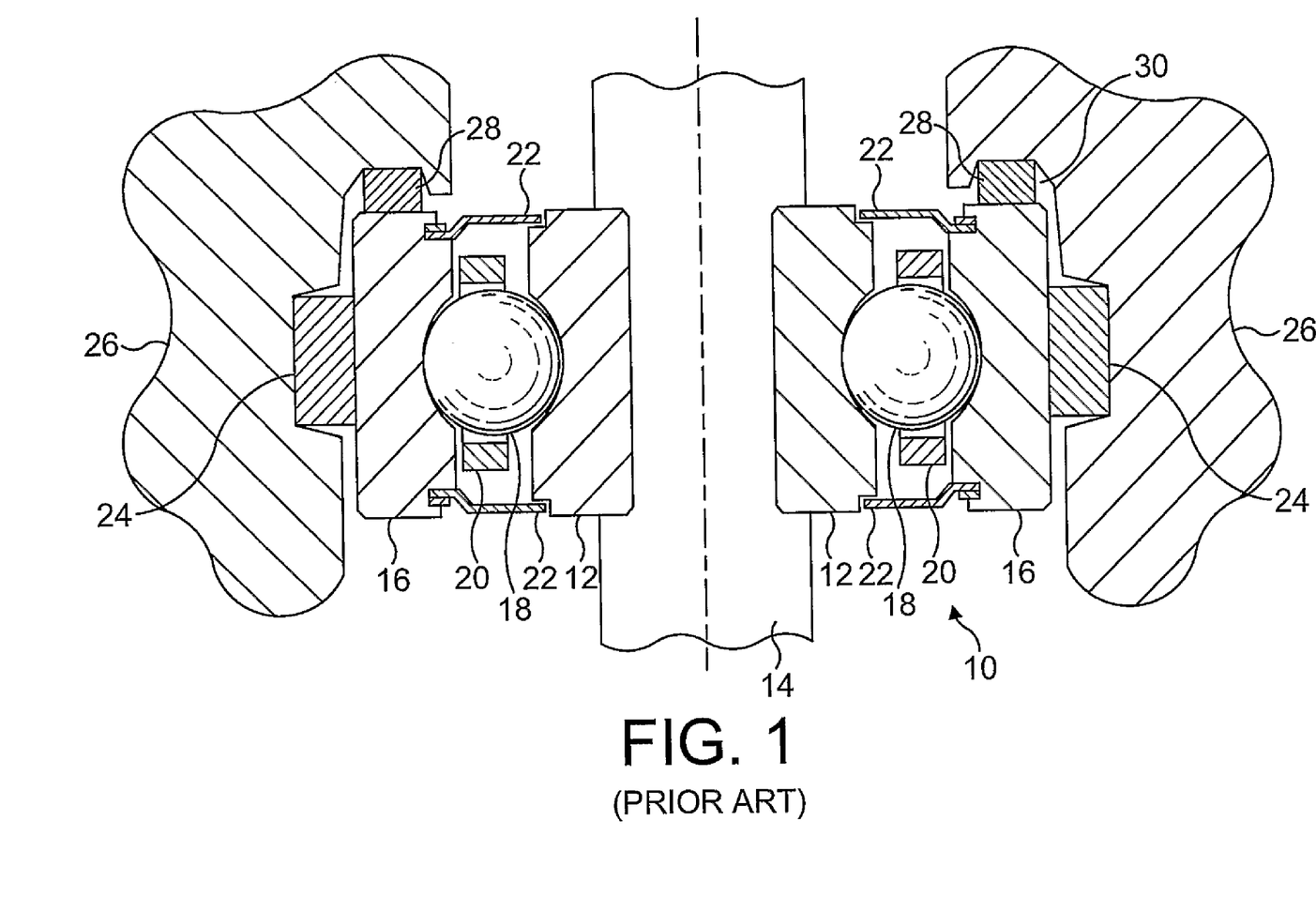
FIG. 1 illustrates a cross-sectional view of a known rolling bearing.

As illustrated in FIG. 1, a typical rolling bearing 10 comprises an inner race 12 fixed relative to shaft 14 of the pump, an outer race 16, and a plurality of rolling elements 18, supported by a cage 20, for allowing relative rotation of the inner race 12 and the outer race 16. The rolling bearing 10 is lubricated to establish a load-carrying film separating the bearing components in rolling and sliding contact in order to minimize friction and wear, and shield elements 22 are provided to resist seepage of lubricant out of the rolling bearing 10. A mounting arrangement for supporting the rolling bearing 10 within the pump comprises a radial elastomeric damping ring 24 positioned radially between the outer race 16 and a housing portion 26 for damping radial movement of the outer race 16, and an axial elastomeric damping ring 28 positioned between an end face of the outer race 16 and the housing portion 26 for damping axial movement of the outer race 16.

There are a number of problems associated with use of radial and axial elastomeric damping rings 24, 28 for attenuating vibrations within a vacuum pump.

Firstly, complex damping ring locations are also required for dynamic stability. A thin axial damping ring is required for beneficial axial to radial stiffness contribution, and precise location of a thin axial ring requires complex machining to ensure dynamic stability. Radial damping rings require full grooves for reliable axial location. These grooves have tight tolerances, requiring difficult and expensive machining, and can be difficult to clean, leading to contamination and premature bearing failure.

Secondly, good vibration isolation of a turbomolecular pump requires the mounting arrangement for the lower rolling bearing 10 to have a low radial stiffness. The overall radial stiffness of the mounting arrangement described above is the sum of the stiffness of the radial damping ring 24, and a further stiffness relating to shear deformation of the axial damping ring 28. However, the minimum hardness of elastomeric material restricts the minimum radial stiffness attainable using radial and axial elastomeric damping rings. Furthermore, over a period of time elastomeric material suffers from creep and stress relaxation under load. Elastomeric material also softens due to interaction with any lubricant discharged from the bearing. Softening of the axial damping ring increases the shear modulus of that damping ring and thus the effective radial stiffness of the mounting arrangement for the lower bearing, thereby undesirably increasing the vibration transmission to the pump housing with time.

The stiffness characteristics of elastomeric material are highly non-linear, and change markedly with time, temperature and interaction with lubricant, and so there is currently no accurate analytical model for predicting the stiffness and damping characteristics of the damping rings during use.

In addition, it is normal practice to carry out low-speed coarse balancing of the pump using a "slave" rolling bearing fitted to the rotor, so that the "final" rolling bearing that will be used during normal use of the pump is not subjected to excessive loads during balancing. When the final bearing is subsequently fitted to the rotor, there is however a degree of imbalance due to the differences in fit and raceway run out between the slave and final bearings. Consequently, high speed balancing must then be performed when the final bearing is fitted to the rotor. Since the stiffness characteristics of elastomeric material change with time, temperature and interaction with the bearing lubricant, the dynamic properties of the pump change during balancing, which leads to an increase in the duration of the balancing process to accommodate the variation with time of the mechanical properties of the mounting arrangement.

It is an aim of at least the preferred embodiments of the present invention to seek to solve these and other problems.

SUMMARY OF THE INVENTION

The present invention provides a vacuum pump, preferably a turbomolecular is vacuum pump, comprising a housing and a rotor supported by a bearing arrangement for rotation relative to the housing, the bearing arrangement comprising a bearing supported in both radial and axial directions by a resilient support comprising inner and outer annular portions connected by a plurality of flexible members.

In another embodiment, at least one elastomeric damping member is located between the inner and outer annular portions of the resilient support. For example, one damping member may be configured to provide damping of radial vibrations, and another damping member may be configured to provide damping of axial vibrations. Each damping member may comprise an elastomeric ring located within an annular groove formed in a respective end surface of the resilient support. As no lubricant is then required to produce damping films for damping vibrations, the pump can again be utilised in any convenient orientation without the loss of lubricant from the resilient support.

BRIEF DESCRIPTION OF THE DRAWINGS

Preferred features of the present invention will now be described, by way of example only, with reference to the accompanying drawings, in which.

DETAILED DESCRIPTION OF THE INVENTION

The present invention provides a vacuum pump, preferably a turbomolecular vacuum pump, comprising a housing and a rotor supported by a bearing arrangement for rotation relative to the housing, the bearing arrangement comprising a bearing supported in both radial and axial directions by a resilient support comprising inner and outer annular portions connected by a plurality of flexible members.

The radial and axial elastomeric sealing rings of the prior art are thus replaced by a single resilient support. As only a single resilient support is required instead of, as in the prior art, two separate damping rings, costs can be significantly reduced. Location features for the resilient support can be much simplified, and thus less expensive to machine. For example, no full groove may be provided for mounting of the resilient support. In comparison to the installation of two separate damping rings, installation of the single resilient support is relatively straightforward.

The flexible of the resilient support may be readily designed, for example using finite element analysis, to have predetermined flexure characteristics adapted to the vibrational characteristics of the rotor. The resilient support can thus be designed with a very low radial stiffness, in the range from 50 to 500 N/mm, preferably around 200 N/mm, to meet the required rotor dynamics of the vacuum pump. As the axial damping ring of the prior art is eliminated, there is no contribution from such a member to the overall radial stiffness, and so the total radial stiffness can be very low. In view of this, acceptable levels of transmitted imbalance vibration may be achieved, irrespective of the imbalance resulting from the differences of fit and raceway run-out of "slave" and "final" bearings. As a result, no high speed balancing may be required.

Each of the flexible members is preferably an elongate, arcuate member substantially concentric with the inner and outer annular portions. In the preferred embodiment, these members are circumferentially aligned. The flexible members of the resilient support can thus provide integral leaf springs of the resilient support, and hence determine the radial stiffness of the resilient support.

The resilient support may be conveniently formed from a metallic material, such as tempered steel, aluminium, titanium, phosphor bronze, beryllium copper, an alloy of aluminium and an alloy of titanium. In this case, the stiffness of the resilient support is dependent on the geometry of the leaf springs, and not on temperature. At relative low radial stiffness, there will be no significant creep, stress relaxation or lubricant interaction effects that will change the radial stiffness of the resilient support with time.

The resilient support preferably comprises a plurality of slots defining said flexible members. In one preferred embodiment, means are provided for supplying lubricant or other fluid to the slots to provide load-bearing damping films. During use of the pump, the bearings are subjected to vibrations brought about by certain imbalances in the rotor. During these vibrations, the hydraulic damping films provided by the presence of the lubricant within the slots of the resilient support are compressed at a certain angular location, and the vibrations drive this point of compression about the resilient support. The presence of lubricant maintained under pressure within the slots has the effect of damping the vibrations, thereby attenuating the transfer of the vibrations to the housing of the vacuum pump.

The fluid supply means may comprise a fluid reservoir located on the resilient support and in fluid communication with the slots. For example, the reservoir may comprise an annular groove formed in an end surface of the resilient support, from which fluid is supplied to the slots. A second fluid reservoir may also be provided by another annular groove formed in the opposite end surface of the resilient support and in fluid communication with the slots. In one embodiment, the two reservoirs are sealed so as to retain a fixed amount of fluid within the resilient support. This can enable the pump to be utilised in any convenient orientation without the loss of lubricant from the resilient support.

In another embodiment, a fluid pump is provided for supplying fluid from a source thereof. The pump may utilise the lubricant source used to provide lubricant to the bearing during use of the pump. For example, in order to supply lubricant to the bearing, means may be provided for supplying a lubricant to the rotor from a source thereof, with means provided on the rotor for conveying the lubricant to the bearing with rotation of the rotor. In one preferred embodiment, a felt wick feeds lubricant to the rotor. A conical surface having a diameter increasing towards the bearing is provided on the rotor, for example, by a conical nut or by an integral surface of the rotor. With rotation of the rotor, the lubricant travels along the conical surface, and at the end of thus surface is flung into the bearing. Means are then provided for supplying the lubricant discharged from the bearing to the slots of the resilient support. For example, the bearing and resilient support may be located within a cartridge attached to the housing, the cartridge at least partially defining an annular cavity for receiving the lubricant discharged from the bearing and from which the discharged lubricant is supplied under gravity to the slots of the resilient support.

As no separate lubricant source or supply is required for the resilient support, costs are minimised. Furthermore, such a lubricant supply system delivers lubricant at a flow rate f, where f is proportional to $1/\omega^2$, where $\omega$ is the rotational speed of the rotor. As a result, the rate of supply of the lubricant to the slots will be relatively high during the initial running-up of the rotor to maximum rotational speed, and the subsequent running-down of the rotor from maximum rotational speed. By suitable design of the slots within the resilient support, it is possible to arrange that the damping films are fully charged with lubricant during run-up and run-down, so that maximum damping is provided to control "critical speeds", that is, speeds associated with very high vibration, during run-up and run-down.

In another embodiment, at least one elastomeric damping member is located between the inner and outer annular portions of the resilient support. For example, one damping member may be configured to provide damping of radial vibrations, and another damping member may be configured to provide damping of axial vibrations. Each damping member may comprise an elastomeric ring located within an annular groove formed in a respective end surface of the resilient support. As no lubricant is then required to produce damping films for damping vibrations, the pump can again be utilised in any convenient orientation without the loss of lubricant from the resilient support.

Means may be provided for axially locating the bearing and the resilient support within the housing. It is advantageous to allow the bearing some radial movement in order to reduce the transfer of vibration from the pump rotor to the pump housing, caused by residual imbalance. As the resilient support may have very low stiffness, when there is high imbalance there may be a relatively large rotor and bearing displacement. To avoid contact between the rotor and the stationary parts of the pump, in particular between the blades of the rotor and the stator of the pump, the axially locating means may conveniently provide a radial stop surface for limiting the maximum allowable radial displacement of the rotor and the bearing. Where lubricant is supplied to the resilient support, means may be provided for conveying lubricant from the slots of the resilient support to a clearance between an axially extending outer surface of the outer race and the radial stop surface. The clearance between the outer race and the radial stop surface can thus form a damping film for damping vibrations of the bearing.

Where an axial damping ring is mounted in the resilient support, the axial resilient support may be compressed by the axially locating means to provide axial damping.

Figure 2:
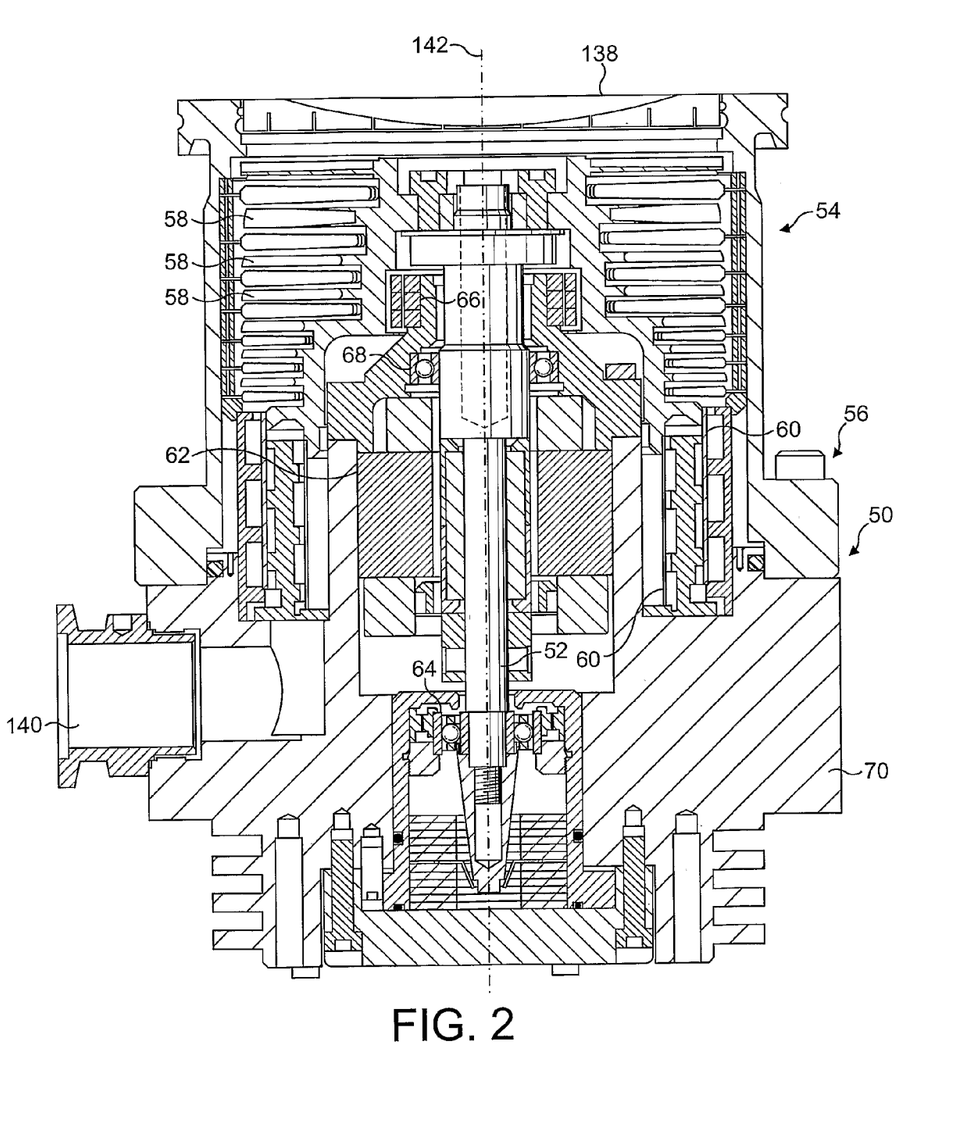
FIG. 2 illustrates a cross-sectional view of a turbomolecular vacuum pump.

FIG. 2 shows a cross-section of a vacuum pump 50 comprising a pumping arrangement driven by a shaft 52. The illustrated vacuum pump is a turbomolecular vacuum pump comprising a turbomolecular pumping mechanism 54 and a molecular drag pumping mechanism 56. The turbomolecular pumping mechanism comprises a plurality of rotor blades 58 mounted on, or integral with, the shaft 52. The molecular drag pumping mechanism 56 is in the form of a Holweck pumping mechanism, and comprises one more cylinders 60 mounted on the shaft 52. The shaft is rotated by a motor 62 to drive the pumping arrangement.

The shaft 52 is supported by a bearing arrangement comprising two bearings which may be positioned either at respective ends of the shaft as shown or alternatively intermediate the ends. In FIG. 2, a rolling bearing 64 supports a first portion of the shaft 52 and a magnetic bearing 66 supports a second portion of the shaft 52. A second rolling bearing may be used as an alternative to the magnetic bearing 66. When a magnetic bearing is used, a back-up rolling bearing 68 may optionally be provided.

Figure 3:
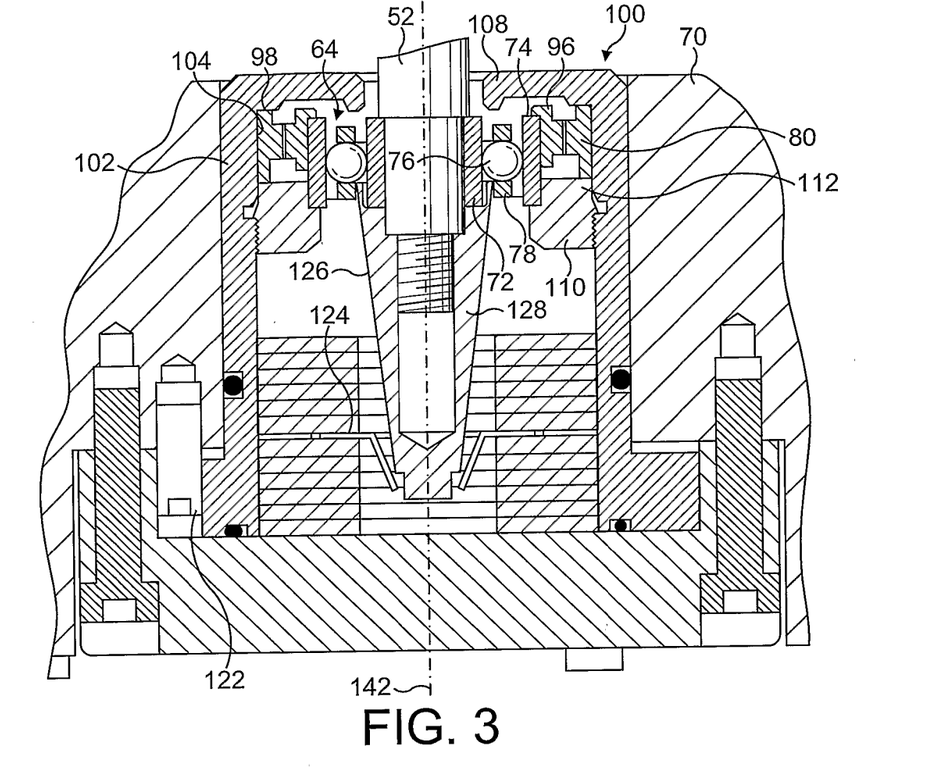
FIG. 3 illustrates a close-up of part of the vacuum pump of FIG. 2 illustrating a cross-sectional view of a rolling bearing supported by a first embodiment of a resilient support.

With reference also to FIG. 3, the rolling bearing 64 is provided between the second end portion of the shaft 52 and a housing portion 70 of the pump 50. The rolling bearing 64 comprises an inner race 72 fixed relative to the shaft 52, an outer race 74, and a plurality of rolling elements 76, supported by a cage 78, for allowing relative rotation of the inner race 72 and the outer race 74. As discussed in more detail below, the rolling bearing 64 is lubricated using a lubricant such as oil to establish a load-carrying film separating the bearing components in rolling and sliding contact in order to minimize friction and wear.

Figure 4:
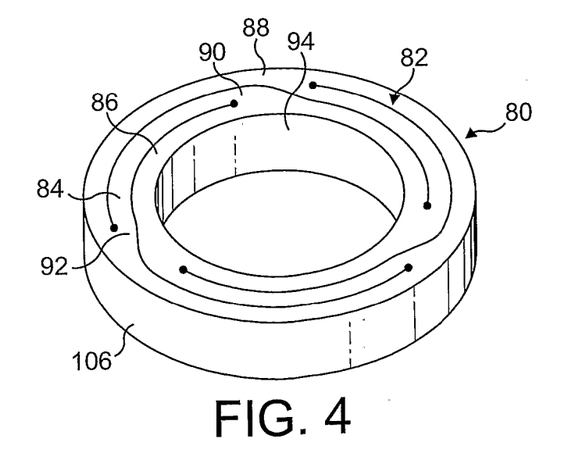
FIG. 4 is a perspective view of the resilient support of the vacuum pump of FIG. 2.

In order to provide damping of vibrations of the shaft 52 and bearing 64 during use of the pump 50, a resilient support 80 is provided for supporting the bearing 64 in both radial and axial directions relative to the housing 70. As illustrated in FIG. 4, the resilient support 80 comprises a plurality of slots 82 that define a plurality of integral flexible members 84 of the resilient support 80. Each flexible member 84 is located between an inner annular portion 86 of the resilient support 80 and an outer annular portion 88 of the resilient support 80. Each flexible member 84 is connected by a first resilient hinge 90 to the inner portion 86, and by a second resilient hinge 92 to the outer portion 88.

Each flexible member 84 is in the form of an elongate, arcuate member substantially concentric with the inner and outer annular portions 86, 88, and, as illustrated in FIG. 4, are preferably circumferentially aligned. The flexible members 84 of the resilient support 80 thus provide integral leaf springs 84 of the resilient support 80, each leaf spring 84 being associated with one slot 82 located adjacent an inner circumferential surface thereof, and another slot 82 located adjacent an outer circumferential surface thereof.

Figure 5:
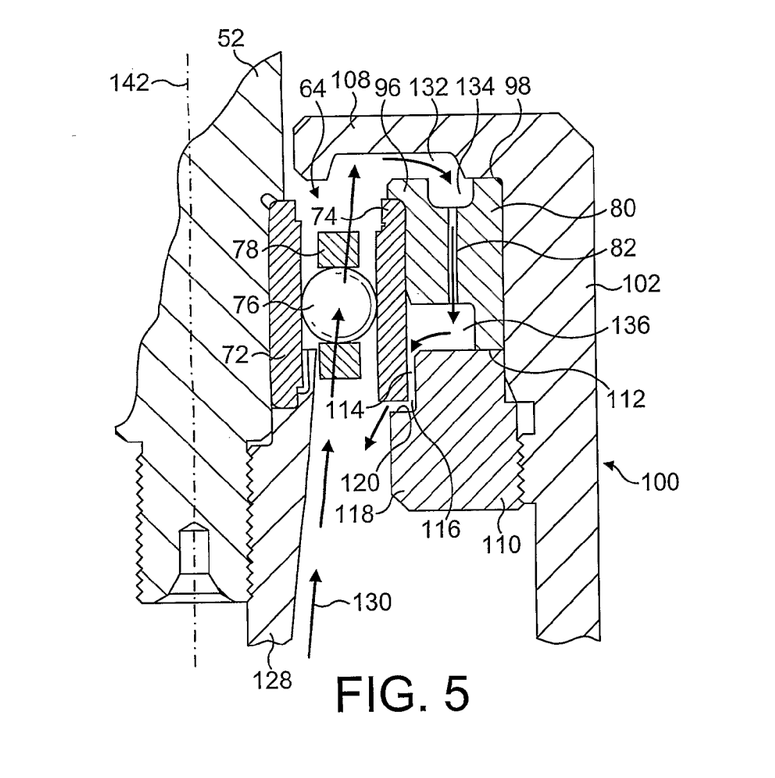
FIG. 5 illustrates the supply of lubricant to the resilient support of the vacuum pump of FIG. 2.

The inner portion 86 has an inner, axially extending cylindrical surface 94 engaging the outer surface of the outer race 74 of the rolling bearing 64. As illustrated in FIGS. 3 and 5, the inner portion 86 also has a radially inward extending shoulder portion 96 located towards the upper (as illustrated) end surface 98 thereof for engaging the upper surface of the outer race 74 of the rolling bearing 64 for axially supporting the bearing 64.

A cartridge 100 is provided for retaining the resilient support 80 relative to the housing 70. The cartridge 100 has an axially extending wall 102 having an inner surface 104 engaging an outer, axially extending cylindrical surface 106 of the outer portion 88 of the resilient support 80. The cartridge 100 also has a radially inward extending wall 108 having a lower (as illustrated) wall engaging the upper end surface 98 of the resilient support 80, so that the resilient support 80 is supported in both radial and axial directions by the cartridge 100.

A bearing nut 110 is attached to the inner surface 104 of the cartridge 100 by means of mutually-engaging screw threads such that an upper (as illustrated) end surface of the bearing nut 110 engages the lower end surface 112 of the resilient support 80 to retain the resilient support 80 within the cartridge 100, and to preferably axially pre-load the resilient support 80. As illustrated in FIG. 5, the bearing nut 110 has an inner axially extending surface 114 spaced from the outer surface of the outer race 74 of the bearing 64 by axially extending clearance 116 to provide a radial end stop surface for limiting radial movement of the rotor 52 and bearing 64. The bearing nut 108 also has a radially inward extending portion 118 having an upper (as illustrated) surface 120 spaced from the lower end surface of the outer race 74 of the bearing to provide an axial end stop surface for limiting axial movement of the rotor 52 and bearing 64.

Returning to FIG. 3, the cartridge 100 is attached to the housing 70 by means of bolts 122 thereby to secure the resilient support 80 relative to the housing 70.

The resilient support 80 is preferably formed from metallic material, such as aluminium or an alloy thereof, tempered steel, beryllium copper, phosphor bronze, titanium or an alloy thereof, or other metallic alloy. The stiffness of the resilient support 80 is determined by the geometry of the slots 82, and thus the geometry of the leaf springs 84, and can be accurately estimated using finite element analysis. We have found that the resilient support 80 can be readily designed to have a relatively low radial stiffness in the range from 50 to 500 N/mm, for example around 200 N/mm, for inhibiting the transmission of vibrations from the rotor 52 to the housing 70.

In this embodiment, the pump 50 includes a lubricant supply system for supplying lubricant or other fluid to both the rolling bearing 64 and to the slots 82 of the resilient support 80 to form damping films within the slots 82 for damping vibrations of the rotor 52 during use of the pump 50. The lubricant supply system comprises a centrifugal pump including one or more wicks 124 for supplying lubricant from a lubricant reservoir of the pump 50 to the tapered surface 126 of a conical nut 128 located on one end of the rotor 52. With rotation of the rotor 52, the lubricant travels along the tapered surface 126, into the lower (as illustrated) end of the bearing 64, and is subsequently discharged from the upper end of the bearing 64. An annular groove 132 is formed in the radially extending wall 108 of the cartridge 100 for deflecting lubricant discharged from the bearing 64 towards the resilient support 80 so that the lubricant is fed under gravity into the slots 82 of the resilient support 80. As illustrated in FIG. 5, an annular groove 134 is formed in the upper end surface 98 of the resilient support 80 to provide a reservoir for receiving lubricant from the groove 132 in the cartridge 100 and feeding lubricant into the slots 82. The lubricant generates load-bearing damping films adjacent the inner and outer circumferential surfaces of the leaf springs 84. With vibration of the rotor 52, the damping films are compressed; generating hydrodynamic pressure. The presence of lubricant maintained under pressure within the slots has the effect of damping the vibrations, thereby attenuating the transfer of the vibrations to the housing of the vacuum pump.

The degree of the damping achieved by the damping films depends, inter alia, on the geometry of the slots 82 formed in resilient support 80. When the radial width of the slots 82 is relatively large, the formation of the slots 82 in the cylindrical member 80 is simplified but the damping of vibrations by the lubricant therein is relatively low. When the slots 82 are relatively wide, an additional damping film can be provided by the supply of lubricant to the clearance 116 between the outer surface of the outer race 74 and the inner axially extending surface 114 of the bearing nut 110. As illustrated in FIG. 5, this may be achieved by forming another annular groove 136 in the lower end surface 112 of the resilient support 80 for receiving lubricant discharged from the lower ends of the slots 82 and conveying the lubricant to the clearance 116. The lubricant passing through the clearance 116 forms a further damping film for damping vibrations of the rotor 52. The lubricant discharged from the clearance 116 is returned to the oil reservoir of the pump 50 for subsequent return to the bearing 64.

Figure 6:
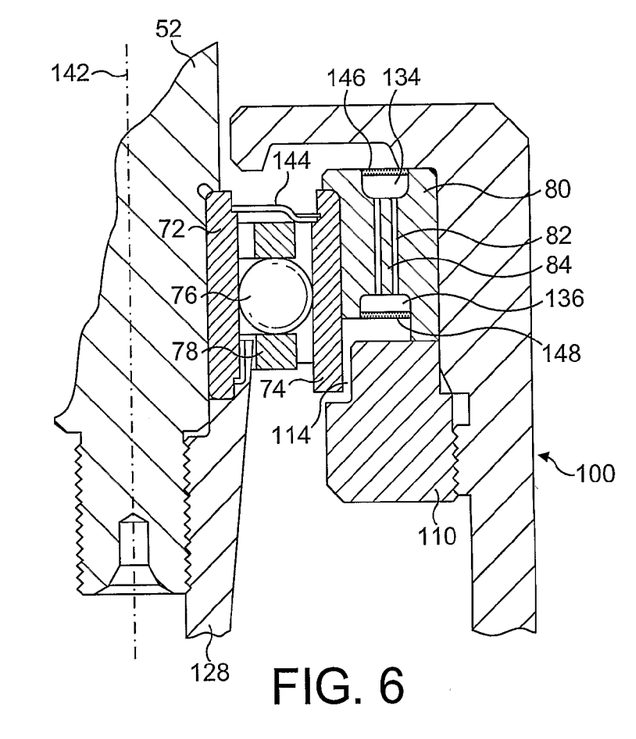
FIG. 6 illustrates a cross-sectional view of a rolling bearing supported by a second embodiment of a resilient support.

Due to the feeding of lubricant from the annular groove 132 of the cartridge 100 to the slots 82 under gravity, the lubricant supply system described above to is suitable for supplying lubricant to the slots 82 of the resilient support 80 when the pump 50 is arranged in an upright position as illustrated in FIG. 2, that is, gas inlet 138 of the pump 50 located above the gas outlet 140 from the pump 50, and with the longitudinal axis 142 of the pump 50 extending substantially vertically. In the second embodiment illustrated in FIG. 6, the lubricant is supplied to the slots 82 of the resilient support 80 separately from the supply of lubricant to the bearing, and in such a manner that the pump 50 can be operated in any orientation. In this embodiment, a similar lubricant supply system may be used to supply lubricant to the bearing 64, and shield elements 144 may be provided to resist seepage of lubricant from the bearing 64. The shield may be a separate component, held in place by a spring clip or other fastener, or may be an integral part of the outer race 74. Alternatively, the bearing 64 may be lubricated using grease (a mixture of oil and a thickening agent). In order to supply lubricant to the slots 82 of the resilient support 80, the annular grooves 134, 136 formed in the end surfaces of the resilient support 80 are used to provide lubricant reservoirs, each of which is at least partially filled with lubricant and sealed with a respective annular sealing element 146, 148 adhered or otherwise mounted on the end surfaces of the resilient support 80 to retain the lubricant within the slots and the reservoirs. By only partially filling one of the reservoirs, the lubricant can circulate between the slots 82 of the resilient support 80 when radial squeezing of the lubricant occurs during use of the pump 50.

Figure 7:
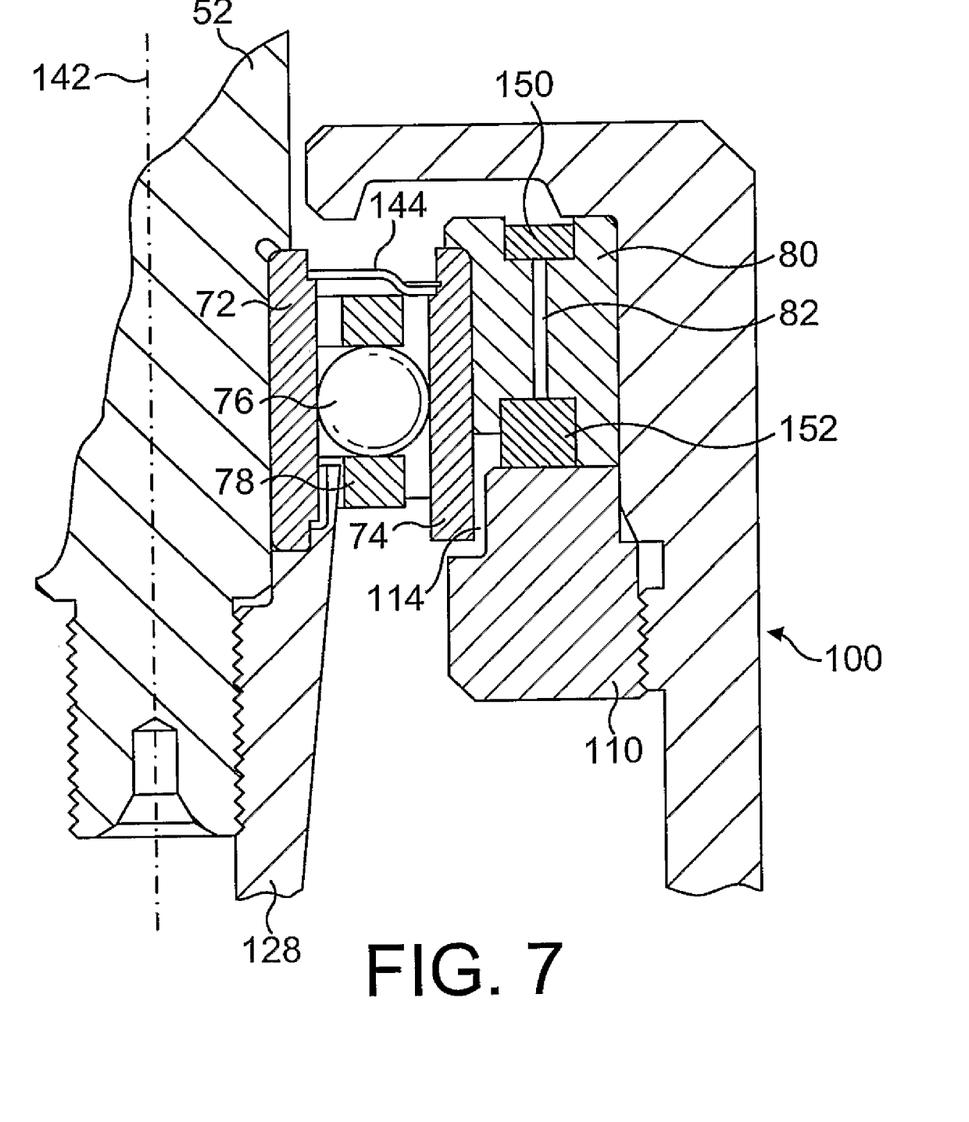
FIG. 7 illustrates a cross-sectional view of a rolling bearing supported by a third embodiment of a resilient support.

In the third embodiment illustrated in FIG. 7, no lubricant is supplied to the slots 82 to damp vibrations. In this embodiment, first and second elastomeric damping rings 150, 152 are each located in a respective one of the annular grooves 134, 136 formed in the end surfaces of the resilient support 80. The damping rings 150, 152 are designed to have a relatively loose radial fit within the grooves 134, 136, and the second damping ring 152 is axially compressed by the bearing nut 110. Relatively large radial displacements of the rotor 52 and bearing 64 during use of the pump 50, for example, due to a relatively high imbalance or when running at or around critical speeds, causes the damping rings 150, 152 to be radially compressed, resulting in radial damping of the vibrations. When the vibrations are relatively small, little radial damping is produced by the damping rings 150, 152, and so there is little transmission of the vibrations to the cartridge 100 and therefore to the housing 70. Due to the compression of the second damping ring 152, the second damping ring 152 damps axial vibrations of the bearing 64. Without relying on lubricant to damp vibrations, the pump 50 can again be operated in any orientation.

While the foregoing description and drawings represent the preferred embodiments of the present invention, it will be apparent to those skilled in the art that various changes and modifications may be made therein without departing from the true spirit and scope of the present invention.

We claim:

1. A vacuum pump comprising:
   a housing;
   a rotor supported by a bearing arrangement for rotation relative to the housing, the bearing arrangement comprising a bearing supported in both radial and axial directions by a resilient support comprising inner and outer annular portions connected by a plurality of flexible members, the resilient support having a radial stiffness in the range from 50 to 500 N/mm, and a plurality of slots defining the flexible members; and
   means for supplying fluid to the slots to provide load-bearing damping films, wherein the fluid supply means comprises a fluid reservoir located on the resilient support and in fluid communication with the slots.

2. The vacuum pump according to claim 1 wherein each of the flexible members is an elongate, arcuate member substantially concentric with the inner and outer annular portions.

3. The vacuum pump according to claim 2 wherein the flexible members are circumferentially aligned.

4. The vacuum pump according to claim 1 wherein the flexible members provide a plurality of integral leaf springs of the resilient support.

5. The vacuum pump according to claim 1 wherein the flexible members are axially displaced to axially preload the bearing.

6. The vacuum pump according to claim 1 wherein the resilient support is formed from metallic material.

7. The vacuum pump according to claim 6 wherein the metallic material comprises one of tempered steel, aluminium, titanium, phosphor bronze, beryllium copper, an alloy of aluminium and an alloy of titanium.

8. The vacuum pump according to claim 1 wherein the reservoir comprises an annular groove formed in an end surface of the resilient support.

9. The vacuum pump according to claim 1 wherein the fluid supply means comprises a fluid pump for supplying fluid from a source thereof.

10. The vacuum pump according to claim 9 wherein the fluid pump is configured to supply fluid to the bearing for lubrication thereof.

11. The vacuum pump according to claim 10 wherein the fluid pump comprises a wick for supplying fluid to the rotor from a source thereof, and a conical surface located on the rotor for conveying the fluid to the bearing with rotation of the rotor.

12. The vacuum pump according to claim 11 wherein the bearing and resilient support are located within a cartridge attached to the housing, the cartridge at least partially defining an annular cavity for receiving fluid discharged from the bearing and from which the discharged fluid is supplied under gravity to the slots of the resilient support.

13. The vacuum pump according to claim 11 wherein the conical surface is mounted on the rotor.

14. The vacuum pump according to claim 1 comprising at least one elastomeric damping member located between the inner and outer annular portions.

15. The vacuum pump according to claim 14 wherein the at least one elastomeric damping member comprises a radial vibration damping member and an axial vibration damping member.

16. A vacuum pump comprising a housing, a rotor supported by a bearing arrangement for rotation relative to the housing, the bearing arrangement comprising a bearing supported in both radial and axial directions by a resilient support comprising inner and outer annular portions connected by a plurality of flexible members, and at least one elastomeric damping member located between the inner and outer annular portions,
   wherein the at least one elastomeric damping member comprises a radial vibration damping member and an axial vibration damping member,
   wherein the at least one elastomeric damping member is located within an annular groove formed in a respective end surface of the resilient support.

17. The vacuum pump according to claim 16 comprising means for axially locating the bearing and the resilient support within the housing.

18. The vacuum pump according to claim 17 wherein the bearing comprises a rolling bearing having inner and outer races, and wherein the axial locating means comprises a radial stop surface for restricting radial movement of the outer race of the bearing.

19. The vacuum pump according to claim 17 wherein the axial vibration damping member is compressed by the axially locating means.

20. The vacuum pump according to claim 16 wherein the vacuum pump is a turbomolecular vacuum pump.

* * * * *